April 23, 1963    E. H. HARTEL    3,086,733
RETRACTABLE LANDING GEAR
Filed Feb. 4, 1960    2 Sheets-Sheet 1

INVENTOR.
ERWIN H. HARTEL
BY
ATTORNEY

April 23, 1963    E. H. HARTEL    3,086,733
RETRACTABLE LANDING GEAR
Filed Feb. 4, 1960    2 Sheets-Sheet 2
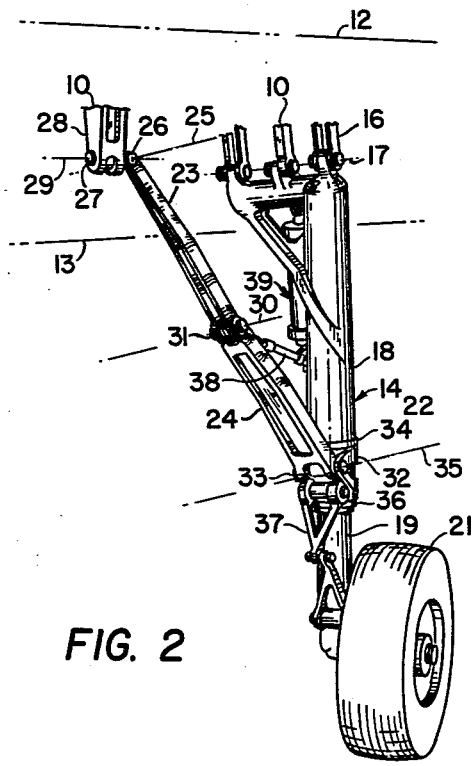
FIG. 2
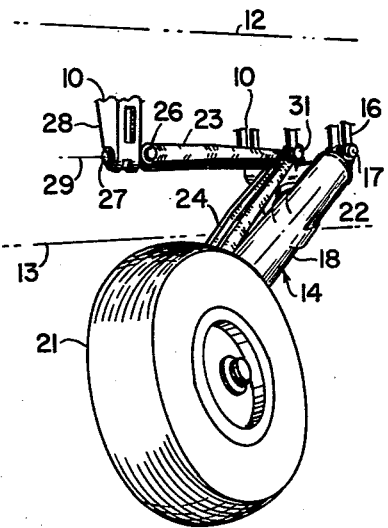
FIG. 3
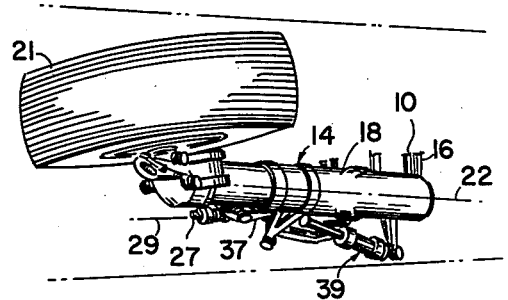
FIG. 4
INVENTOR.
ERWIN H. HARTEL
BY 
ATTORNEY United States Patent Office 3,086,733
Patented Apr. 23, 1963

3,086,733
RETRACTABLE LANDING GEAR
Erwin H. Hartel, Cleveland, Ohio, assignor to The Cleveland Pneumatic Tool Company, Cleveland, Ohio, a corporation of Ohio
Filed Feb. 4, 1960, Ser. No. 6,762
4 Claims. (Cl. 244—102)

This invention relates generally to retractable landing gear structure and more particularly to a new and improved landing gear linkage assembly which operates to swivel or pivot a landing wheel assembly during the retraction and extension operation of the landing gear structure to enable the wheel assembly and the landing gear structure to be retracted into areas within the confines of an aircraft support frame structure.

In modern high performance aircraft the wings are thin, so landing gears which retract into the wing must be arranged to fit into a thin envelope. To accomplish this, the landing wheel assembly should be disposed in a substantially horizontal plane when it is in the retracted position. In the past it has been customary to retract the landing gear inboard of the airframe around a retraction axis substantially parallel to the major axis of the aircraft. Inboard retraction systems, however, do not result in a structure wherein the wind or drag forces on the gear assist in moving the gear to the down and locked position. Whenever possible it is desirable to retract the landing gear forward so the wind or drag loads on the gear will move the gear to the down and locked position even when hydraulic failure occurs. In the preferred landing gear, according to this invention, the gear can be retracted forward and still move to a retracted position wherein the wheel is horizontal.

It is an important object of this invention to provide a new and improved retractable landing gear structure, having a landing wheel assembly carried by an elongate column or strut, with means which automatically swivels or pivots the landing wheel assembly about the longitudinal axis of the strut during the retraction of the landing gear structure.

It is another important object of this invention to provide a retractable aircraft landing gear, having a landing wheel carried by an elongate strut which includes a single drag brace assembly which functions to properly position and brace the landing gear in a down and locked position and also swivels the landing wheel about the longitudinal axis of the landing gear strut during the retraction operation.

It is still another important object of this invention to provide a retractable aircraft landing gear, having a landing wheel carried by an elongate strut, with means incorporating a new and improved drag brace structure operable to automatically swivel the landing wheel around the longitudinal axis of the strut in resopnse to the retracting operation of the landing gear.

It is still another object of this invention to provide a new and improved elongate retractable landing gear structure wherein a landing wheel is swiveled abount the longitudinal axis of the landing gear and a drag brace structure is provided for the landing gear structure and the drag brace is stored in a position horizontally aligned with the landing gear when in the retracted position.

Further objects and advantages will appear from the following description and drawings, wherein:

FIGURE 2 is a perspective view showing the landing gear in the extended or down and locked position.

FIGURE 3 is a view similar to FIGURE 2 illustrating the positions the elements assume in a mid-position between the retracted and extended position.

FIGURE 4 is a view smilar to FIGURES 2 and 3 illustrating the position the elements assume when the landing gear is fully retracted.

The preferred landing gear structure, according to this invention, is illustrated as it could be used on an aircraft haivng thin wings into which the landing gear is retracted and stored during flight. The landing gear structure is also retracted forward so that the wind drag load will operate to extend the gear in the event of a power failure. In order to fit the retracted landing gear forward into such a confined location it is necessary to swivel or pivot a landing wheel assembly about the longitudinal axis of an elongate column or strut through an angle equal to substantially 90°. This causes the landing wheel assembiy to be horizontal disposed in a generally horizontal extending plane for efficient storage, as will be described and disclosed in more detail hereinafter.

Figure 1:
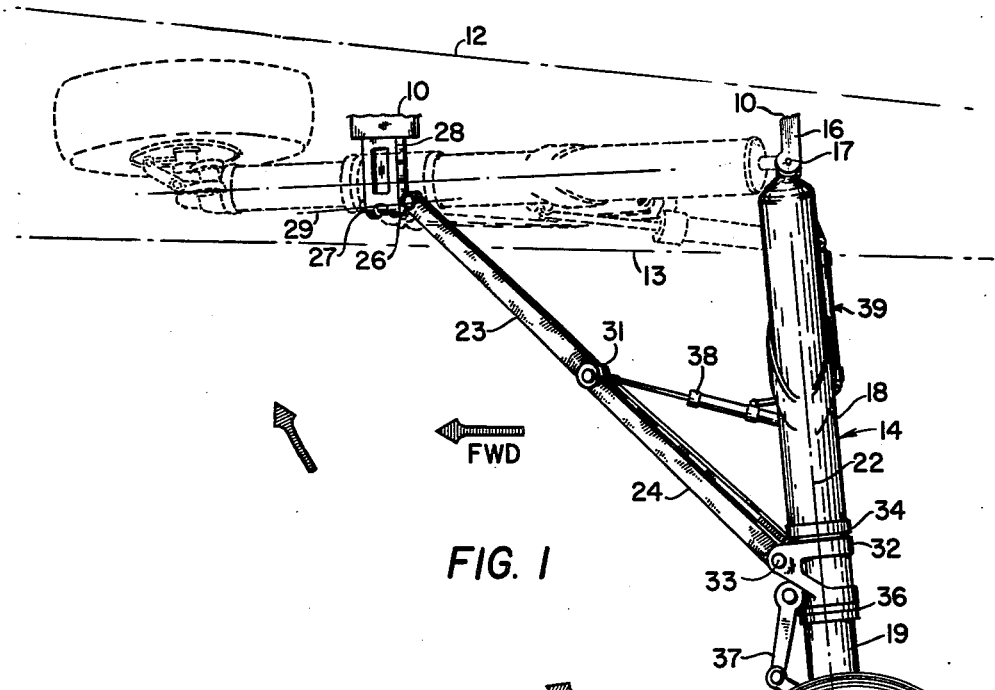
FIGURE 1 is a side elevation illustrating a preferred embodiment of this invention in both the retracted and extended position.

Referring to the drawings FIGURE 1 illustrates the landing gear mounted on an aircraft having frame support structure which is fragmentarily shown at 10. In the illustrated design the lower surface of a wing is illustrated at 13 and the upper surface of the wing is shown at 12.

The landing gear proper includes a shock absorbing elongate column or strut 14 pivoted on a mounting boss 16 which is part of the aircraft frame support structure 10. The connection between the strut 14 and the boss 16 permits relative rotation about a retraction axis 17. The strut 14 includes a conventional type cylinder 18 and a telescoping piston 19 wherein the cylinder 18 is mounted on the boss 16 and the piston 19 supports ground engaging assembly such as a landing wheel 21 at its lower end. The cylinder 18 and piston 19 cooperate in the usual manner to define a fluid spring which resiliently urges the piston 19 downwardly relative to the cylinder 18 while permitting axial upward movement of the piston 19 when the aircraft is on the ground. Such a structure is conventional for aircraft landing gears so the internal structure has not been shown.

In order to brace the strut 14 in the extended position there is provided a linkage assembly comprising an upper drag link-like member or brace 23 and a lower drag link-like member or brace 24 are used. The upper drag brace 23 is connected by a double articulate connection or joint in the form of a pivot pin 26 to a swivel member 27 mounted on a drag brace mounting boss 28. The swivel member 27 is mounted to rotate about its axis 29 and the pivot pin 26 permits rotation of the upper drag brace 23 relative to the swivel member about the axis 25 of the pivot pin 26. In the preferred structure, as shown in FIGURE 2, the axis 25 intersects and is disposed generally normal or substantially perpendicular to the axis 29, therefore, the upper drag brace 23 can move relative to the mounting boss 28 about either the axis 29 or the axis 25. The two drag braces, 23 and 24 are connected by a pivot pin 31 for relative rotation about an axis 30 of the pivot pin 31. Therefore, the two drag braces can fold from the extended position shown in the full view of FIGURE 1 to the retracted position shown in phantom. The lower drag brace 24 is connected to a collar or element 32 by a pivot pin 33 for relative rotation about its axis 35. The collar 32 in turn is journalled on the cylinder 18 for rotation about the longitudinal axis 22. Two spaced shoulders 34 and 36 prevent axial movement of the collar 32 along the cylinder 18. An arrangement such as a pair of torque arms 37 are connected between the collar 32 and the piston 19 in the usual manner to prevent relative rotation therebetween while permitting relative axial movement.

A jury brace 38 connects between the pivot pin 31 and the cylinder 18 to lock the two drag braces 23 and 24 in the aligned position shown when the landing gear is in the extended position. Preferably the jury brace 38 is a hydraulic piston and cylinder actuator which is pressurized to initiate folding at the beginning of the retraction movement. The jury brace 38 also includes an internal lock which operates to maintain the drag braces 23 and 24 in the aligned position when the landing gear is fully extended. An actuator suitable for this purpose is illustrated in the United States Patent to Westcott, No. 2,851,995.

Figure 5:
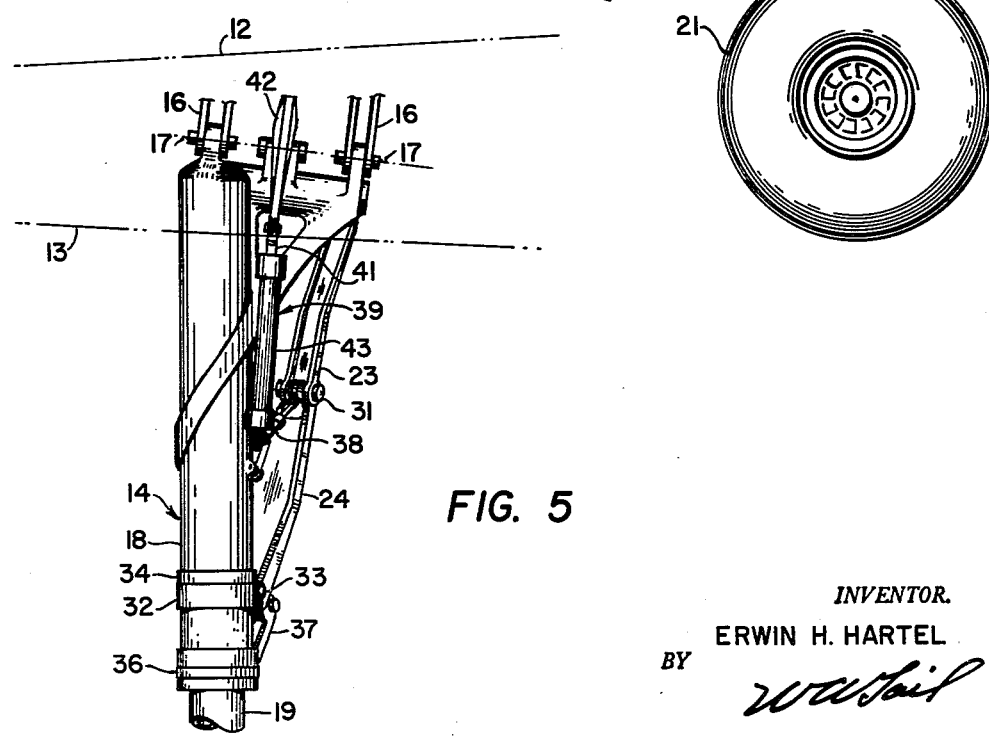
FIGURE 5 is a fragmentary view illustrating the mounting of the actuator used to move the landing gear during the retraction cycle.

The power to move the landing gear between the retracted and extended position is provided by a retraction actuator 39, best illustrated in FIGURE 5. This actuator is of the piston cylinder type which includes a piston 41 connected to a fixed arm 42 mounted on the aircraft frame support structure 10 and a cylinder 43 connected to the cylinder 18 of the strut 14. Preferably the actuator 39 is double acting so that it can be extended to move the landing gear to the retracted position or compressed to move the landing gear to the down and locked position.

In the preferred structure the drag brace mounting boss 28 is located at a point inboard of the strut 14 when the landing gear is in the retracted position shown by the phantom view of FIGURE 1. The axis 29 is arranged to intersect the retracted axis 17 at its intersection with the axis 22 and the pivot pins 26, 31 and 33 are all parallel to each other. The three pivot pins 26, 31 and 33 are also perpendicular to a plane containing the two axes 29 and 22. Therefore, the folding of the drag braces 23 and 24 will take place in this plane which is not perpendicular to the retraction axis 17. Because the drag brace mounting boss 28 is located at a point horizontally spaced inboard of the strut 14 when the strut is in the retracted position, the plane containing the two axes 29 and 22 is substantially horizontal when the landing gear is in the retracted position. This same plane is substantially vertical when the landing gear is down and locked so the two drag braces 23 and 24 which fold in the plane cause the collar 32 to rotate through substantially 90° relative to the strut 14 during the retraction operation. This is best illustrated by comparing the views of FIGURES 2 through 4 which illustrate the rotation of the collar 32 caused by the drag braces 23 and 24. The rotation of the collar 32 also causes the piston 19 and the wheel 21 to rotate or swivel about the longitudinal axis 22 by virtue of their connection through the torque arms 37. During retraction the drag braces 23 and 24 move to a position horizontally beside the strut 14 so they are easily stored within the wing envelope. The preferred structure can be considered in another way. The pivot axes 25, 30 and 35 are all non-parallel to the retraction axis 17. Therefore, the drag braces 23 and 24 cause the collar 32 to rotate about the cylinder 18 during retraction.

In the illustrated embodiment the axes of the pivot pins 25, 30 and 35 are all parallel, however, such an arrangement is not essential to this invention since it is possible to change the position of the drag braces 23 and 24 in the retracted position, by arranging the pivot pins non-parallel relative to each other. The effect of this would be to change the position of the folded drag braces 23 and 24 and the degree of rotation of the collar 32. By using the disclosed structure it is possible to produce the required rotation of the landing wheel 21 around the longitudinal axis of the strut 14 while using structure already present for other purposes. In the preferred invention the drag braces 23 and 24 serves the dual function of locking the strut 14 in the extended position as well as positioning the landing wheel 21 in a substantially horizontal position when the strut 14 is retracted. Also the single retraction actuator 39 is used to retract the landing gear and to provide the power for swiveling the wheel assembly 21 around the axis 22 of the strut 14.

It should be pointed out that even though this invention is illustrated in an installation, wherein the landing gear is retracted into the aircraft wing, it is also useful in other types of installations wherein the airframe structure results in space limitations. In some cases where the landing gear is retracted into the aircraft fuselage the airframe structure may require the wheel to be swivelled in this manner.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:
1. A retractable landing gear for an aircraft having a frame, said landing gear comprising an elongated strut journalled on said frame for rotation about a retraction axis between a substantially vertically extended position and a substantially horizontal retracted position, an element mounted on said strut for rotation about the longitudinal axis thereof, upper and lower elongated braces, a first pivot connecting said upper brace to said frame for relative rotation about a first axis intersecting said retraction axis and said longitudinal axis and about a second axis perpendicular to a plane containing said first axis and said longitudinal axis, a second pivot connecting said upper and said lower braces for relative rotation about a third axis parallel to said second axis, a third pivot connecting said lower brace and said element for relative rotation about a fourth axis parallel to said second and said third axes, said first axis and said longitudinal axis being in a substantially horizontal plane when said strut is in said retracted positions rotates said element relative to said strut about said longitudinal axis, and a ground engagement wheel supported on said strut for swiveling motion about said longitudinal axis and fixed against swiveling movement relative to said element.

2. In combination with an aircraft having frame support structure, retractable landing gear structure comprising
 an elongate shock absorbing strut of cylinder-piston configuration,
 means for pivotally mounting said strut adjacent one end portion thereof to the aircraft frame support structure for movement of the strut between a substantially vertically disposed extended position and a generally horizontally disposed retracted position relative to the aircraft frame support structure,
 a ground engaging wheel assembly,
 means for supporting said wheel assembly on the strut adjacent the other end portion thereof for pivotal movement of the wheel assembly about the longitudinal axis of said strut,
 a linkage assembly interconnecting the strut to the aircraft frame support structure for enabling the strut to be movable between the said positions, said linkage assembly comprising
 a first elongate drag brace member,
 a double articulate connection having a pair of pivotal axes disposed generally normal relative to each other pivotally connecting one end portion of the first drag brace member to the aircraft frame support structure,
 a collar carried by an intermediate portion of the strut and supported thereon for rotational movement about the longitudinal axis thereof,
 a second elongate drag brace member, means pivotally connecting the second drag brace member to the other end portion of the first drag brace member and to the collar with the pivotal axes of the connections defined by said means being disposed in substantially parallel relationship relative to at least one pivotal axis defined by the double articulate connection, and an arrangement interconnecting the collar and the ground engaging wheel assembly for enabling the ground engaging wheel assembly to be pivotal about the longitudinal axis of the strut in response to rotation of the collar, said linkage assembly, the collar and the arrangement being operable on movement of the strut from the substantially vertically disposed extended position toward the generally horizontally disposed retracted position to pivot said ground engaging wheel assembly about the longitudinal axis of the strut with the landing gear structure retracted relative to the aircraft frame support structure and the longitudinal axis of the strut being disposed substantially parallel to the other pivotal axis of the double articulate connection between the one end portion of the first drag brace member and the aircraft frame support structure.

3. Retractable landing gear structure for aircraft having frame structure, said retractable landing gear structure comprising, an elongate column, means for pivotally mounting one end portion of the column to such aircraft frame structure to enable the column to be movable between a substantially vertically disposed extended position and a generally horizontally disposed retracted position relative to such aircraft frame structure, a ground engaging wheel assembly, means for supporting said wheel assembly adjacent the other end portion of the column with said wheel assembly being pivotally movable about the longitudinal axis thereof, a linkage assembly for interconnecting the column and such aircraft frame structure for urging the column to be movable between the said positions, said linkage assembly comprising a first link-like member, a double articulate connection having a pair of pivotal axes disposed generally normal relative to each other for pivotally connecting one end portion of the first link-like member to such aircraft frame structure, a collar carried by an intermediate portion of the column for relative rotational movement about the longitudinal axis thereof, a second link-like member, means pivotally connecting the second link-like member to the other end portion of the first link-like member and to the collar with the pivotal axes of the connections defined by said means being disposed in substantially parallel relationship relative to at least one pivotal axis defined by the double articulate connection, and an arrangement interconnecting the collar and the ground engaging wheel assembly for enabling the wheel assembly to be pivotal about the longitudinal axis of the column in response to rotation of the collar, said linkage assembly, the element and the arrangement being operable on movement of the column from the substantially vertically disposed extended position toward the generally horizontally disposed retracted position to pivot said ground engaging wheel assembly about the longitudinal axis of the column with the landing gear structure being retracted relative to such aircraft frame structure and the longitudinal axis of the column being disposed substantially parallel to the other pivotal axis of the double articulate connection.

4. Retractable landing gear structure for aircraft, said landing gear structure comprising, an elongate column having one end portion thereof adapted to be journalled to a support structure of an aircraft to enable said column to be movable between a substantially vertically disposed position and a generally horizontally disposed position, a ground engaging assembly supported adjacent the other end portion of said column with said ground engaging assembly being pivotally movable about the longitudinal axis of said column, a linkage assembly for interconnecting the column to such aircraft support structure for urging the column to be movable between the said positions, said linkage assembly comprising a first link-like member, a connection having a pair of pivotal axes disposed generally normal relative to each other for pivotally connecting one end portion of the first link-like member to such aircraft support structure, an element carried by an intermediate portion of the column for relative rotational movement about the longitudinal axis thereof, a second link-like member, means pivotally connecting the second link-like member to the other end portion of the first link-like member and to the element with the pivotal axes of the connections defined by said means being disposed in substantially parallel relationship relative to at least one pivotal axis defined by the connection between the one end portion of the first link-like member and such aircraft support structure, and an arrangement interconnecting the element and the ground engaging assembly for enabling the ground engaging assembly to be pivotal about the longitudinal axis of the column in response to rotation of said element, said linkage assembly, the element and the arrangement being operable on movement of the column from the substantially vertical position toward the generally horizontal position to pivot said ground engaging assembly about the longitudinal axis of the column with the landing gear structure being retratced relative to such aircraft support structure and the longitudinal axis of the column being disposed substantially parallel to the other pivotal axis of the connection between the one end portion of the first link-like member and such aircraft support structure.

References Cited in the file of this patent

UNITED STATES PATENTS

| 2,411,420 | Glasgow et al. | Nov. 19, 1946 |

FOREIGN PATENTS

| 479,532 | Great Britain | Feb. 8, 1938 |
| 610,698 | Great Britain | Oct. 19, 1948 |
| 988,595 | France | May 9, 1951 |